March 17, 1964 B. ALVAREZ ETAL 3,125,662
PORTABLE ELECTRIC CIGARETTE, CIGAR AND PIPE LIGHTER
Original Filed Oct. 21, 1960 4 Sheets-Sheet 2
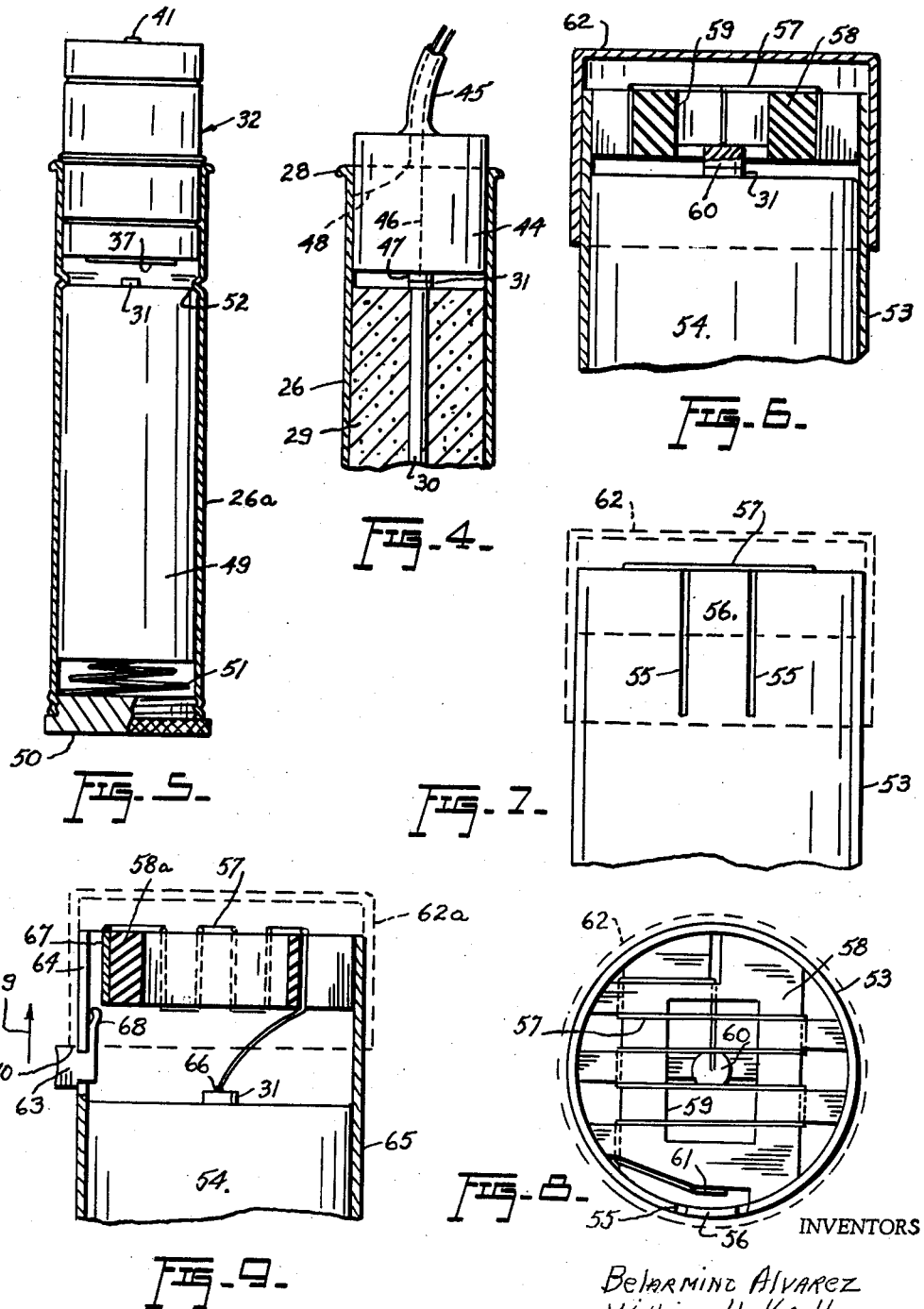
INVENTORS
Belarmino Alvarez
William H. Kroll
BY Munson H. Lane
ATTORNEY

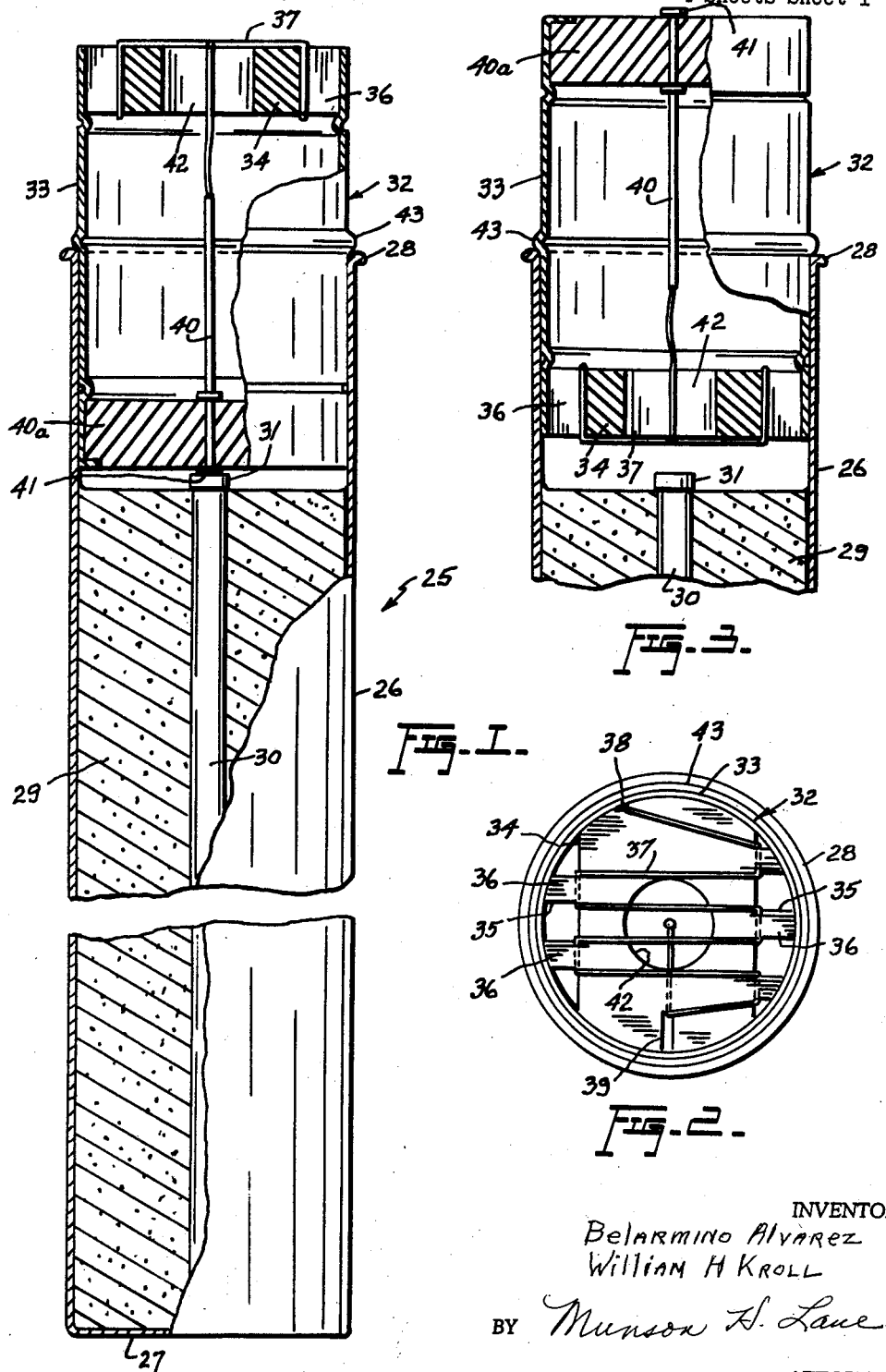

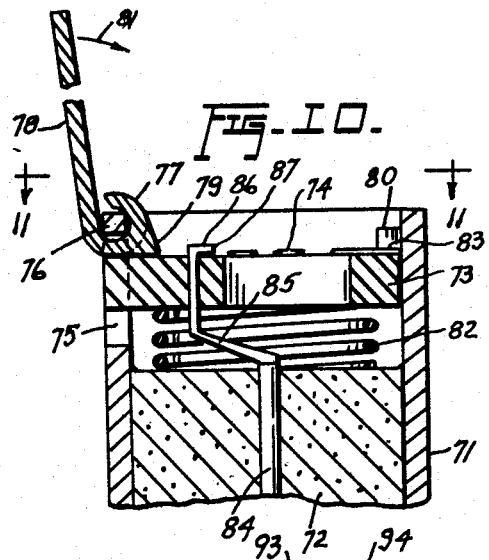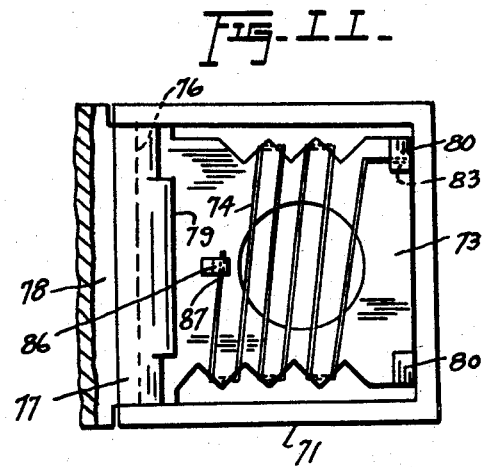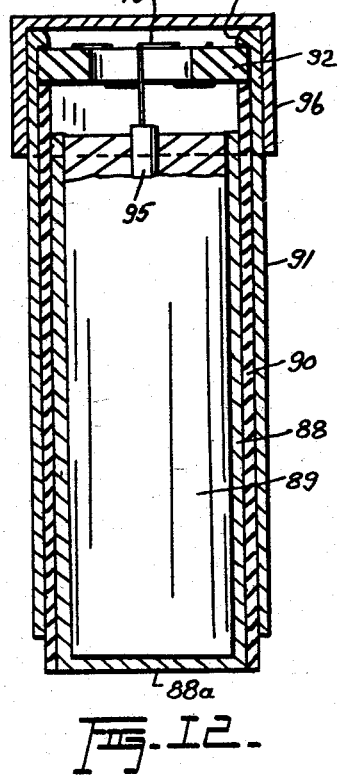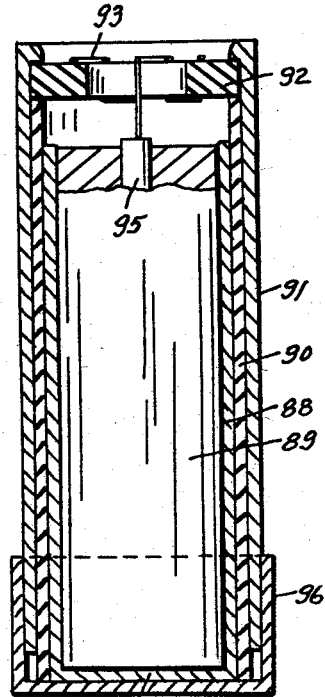

March 17, 1964 B. ALVAREZ ETAL 3,125,662
PORTABLE ELECTRIC CIGARETTE, CIGAR AND PIPE LIGHTER
Original Filed Oct. 21, 1960 4 Sheets-Sheet 4
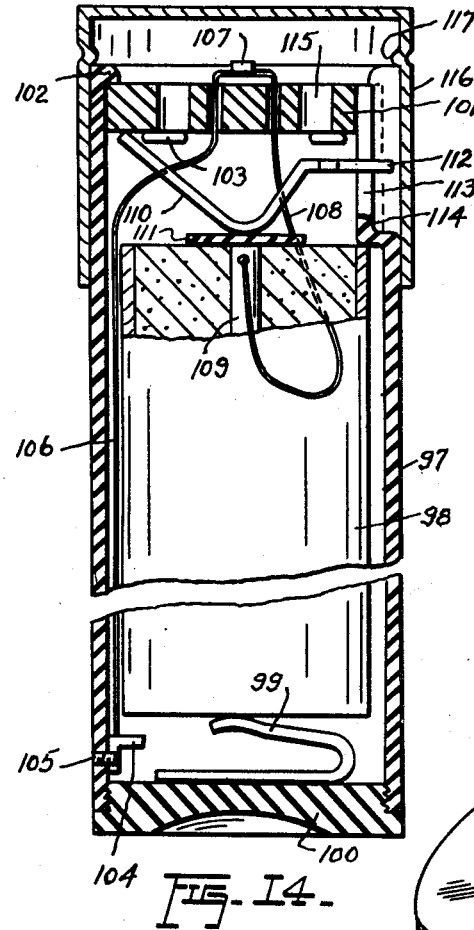
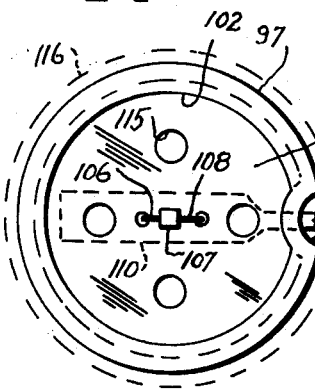
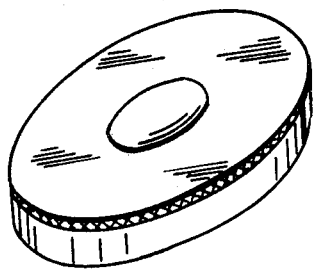
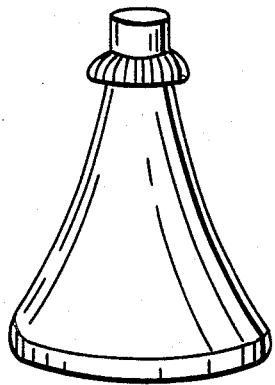
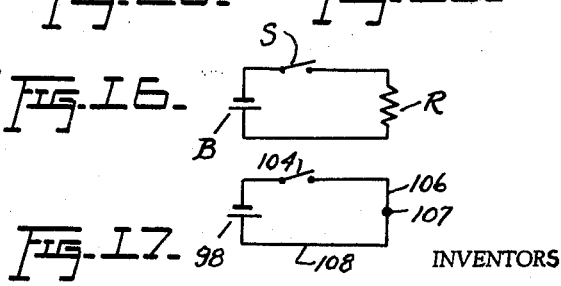
INVENTORS
Belarmino Alvarez
William H Kroll
BY Munson H. Lane
ATTORNEY United States Patent Office 3,125,662
Patented Mar. 17, 1964

3,125,662
PORTABLE ELECTRIC CIGARETTE, CIGAR AND PIPE LIGHTER
Belarmino Alvarez, Estado Bolivar, Venezuela (135 Pinelynn Road, Glen Rock, N.J.), and William H. Kroll, % Orinoco Mining Co., Puerto Ordaz, Estado Bolivar, Venezuela
Original application Oct. 21, 1960, Ser. No. 64,101. Divided and this application Aug. 2, 1961, Ser. No. 132,524
2 Claims. (Cl. 219—32)

This invention relates to new and useful improvements in smoker's appliances or accessories, and the principal object of the invention is to provide a novel lighter which may be conveniently and effectively employed for igniting cigarettes, cigars, smoking pipes, et cetera.

This application is a division of our application Serial No. 64,101, filed October 21, 1960, entitled Portable Electric Cigarette, Cigar and Pipe Lighter.

Unlike pyrophoric lighters of the conventional type, the lighter in accordance with the invention does not require flints, wicks, lighter fluid, and the like, for its operation, and unlike conventional electric lighters, the present lighter does not require an external source of power supply. As such, the lighter in accordance with the invention is a portable, self-contained entity which may be conveniently carried from place to place and/or used whenever required for the purpose for which it is intended.

Accordingly, one feature of the invention resides in the provision of an electric lighter having an energizable element powered by a battery carried in the case of the lighter itself, so that the lighter element may be energized by the battery whenever required by closing of an appropriate, associated switch. In the several disclosed embodiments of the invention the battery is either easily replaceable or rechargeable, so that its power supply is available when needed.

Another feature of the invention resides in the provision of a removable or otherwise openable closure on the lighter casing for the lighter element, such a closure in some embodiments of the invention also functioning as or coacting with switch means for energizing the lighter element by the battery, parts being so arranged that the lighter element may be energized only when the closure is opened or removed to expose the lighter element, so that accidental or unintentional energization of the element is not possible in instances where the device is not in use and the lighter element is covered by the closure.

Some of the advantages of the invention reside in its simplicity of construction, in its efficient and dependable operation, in its convenient use, and in its adaptability to economical manufacture.

With the foregoing objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a vertical elevational view, partly in section, of the lighter in accordance with the invention;
FIGURE 2 is a top plan view thereof;
FIGURE 3 is a fragmentary view, partly in elevation and partly in section, showing the lighter element inverted;
FIGURE 4 is a fragmentary sectional view on a reduced scale, showing a charging plug applied to the lighter;
FIGURE 5 is a vertical sectional view, on a reduced scale, showing a modified arrangement of the invention;
FIGURE 6 is a fragmentary sectional view showing another modified form;
FIGURE 7 is a fragmentary side elevational view of the form shown in FIGURE 6 and with the closure cap illustrated by dotted lines;
FIGURE 8 is a top plan view of the subject shown in FIGURE 7;
FIGURE 9 is a fragmentary sectional view of another modified form of the invention, the closure cap also being shown by dotted lines;
FIGURE 10 is a fragmentary sectional view of another modified form;
FIGURE 11 is a horizontal sectional view, taken substantially in the plane of the line 11—11 in FIGURE 10;
FIGURE 12 is a vertical sectional view of another modified form of the invention, showing the same in its inoperative position;
FIGURE 13 is a sectional view, similar to that shown in FIGURE 12 but with the device in its operative position;
FIGURE 14 is a vertical sectional view of another modified embodiment of the invention;
FIGURE 15 is a top plan view of the embodiment of FIGURE 14 but with the closure cap shown by dotted lines;
FIGURE 16 is a wiring diagram showing one arrangement of the electrical circuit;
FIGURE 17 is a wiring diagram showing another arrangement of the circuit;
FIGURE 18 is a perspective view of a typical lighter, for example, that in accordance with FIGURES 1, 6, 9 or 12;
FIGURE 19 is a perspective view of a typical lighter, for example, in accordance with FIGURE 10;
FIGURE 20 is a perspective view of a lighter embodying another design; and
FIGURE 21 is a perspective view of a lighter embodying still another design.

Referring now to the accompanying drawings in detail, more particularly to FIGURES 1, 2 and 3, one embodiment of the lighter in accordance with the invention is designated generally by the numeral 25 and comprises a cylindrical casing 26 of metal or other electrically conductive material, the casing having a closed bottom 27 and an open top provided with an outturned annular lip 28. The casing 26 constitutes a housing for a dry cell battery 29 which also includes a center pole 30 provided with a contact 31, it being understood that the upper end of the battery 29 is spaced downwardly from the upper end of the casing 26 so that the upper end portion of the casing may accommodate therein a lighter element or assembly designated generally by the numeral 32.

The lighter element or assembly 32 comprises a cylindrical jacket 33 which is formed from metal or other electrically conductive material and has mounted in one end portion thereof an insulating grid 34. As is best shown in FIGURE 2, the grid 34 is fitted in the jacket 33 but is formed with notches 35 whereby portions of the grid between these notches provide sets of protrusions 36. A resistance wire 37 is wound around and under the protrusions 36 so that it passes in a zig-zag manner over the top of the grid, and when electric current is caused to flow through the wire 37, the latter will become heated and may be used to ignite a cigarette, cigar or pipe tobacco with which the lighter is brought in contact.

One end of the wire 37 is grounded to the jacket 33 as shown at 38, while the other end portion of the wire passes through a slot 39 in the grid 34 and is connected to a center post 40 in the jacket, the post 40 being centered in the jacket 33 by an insulating disc 40a and having a contact 41 which is insulated from the jacket. It will be also noted that the grid 34 is provided with an opening 42 to provide an air passage around portions of the resistance wire 37 stretched over the top of the grid.

The jacket 33 is provided intermediate its ends with an annular, outwardly projecting bead 43 which is closer to the end of the jacket having the grid 34 therein than to the relatively opposite end having the contact 41. The lighter element assembly 32 is slidably and reversibly received in the upper end portion of the casing 26 and the relative dimensions of parts are such that when the assembly 32 is inserted in the jacket 26 as shown in FIGURE 1, the contact 41 of the lighter assembly engages the contact 31 of the battery 29, thus automatically completing the electrical circuit from the battery through the post 40, through the resistance wire 37, and through the jacket 33 and casing 26 to the battery, so that the wire 37 is energized and caused to become heated. Upon removing the lighter assembly 32 from the casing 26, the electrical circuit is automatically interrupted by separation of the contacts 31, 41, whereupon the assembly 32 may be inserted in the casing 26 in an inverted position shown in FIGURE 3 wherein the grid 34 and wire 37 are spaced above the battery contact 31. In this inoperative position of the device, the grid 34 and resistance wire 37 are protectively enclosed by the casing 26 and, with the contact 41 disposed exteriorly as shown, accidental or unintentional energization of the resistance wire is prevented.

In FIGURE 4 the lighter element or assembly 32 has been removed from the casing 26 and a charging plug 44 inserted therein. The plug 44 is provided with a flexible conductor 45 having one wire 46 thereof connected to a center contact 47 on the plug, while the other wire 48 of the conductor is grounded to the plug and hence to the casing 26 when the plug is inserted in the latter. In such position the plug contact 47 engages the battery contact 31 and, with the conductor 45 connected to a suitable source of electric current, the battery 29 may be recharged when necessary.

FIGURE 5 illustrates a modified embodiment of the invention wherein the casing 26a accommodates a replaceable battery 49, the casing being provided at its lower end with a removable plug or cap 50 whereby replacement of the battery may be effected. A suitable spring 51 is interposed between the plug 50 and the lower end of the battery for urging the upper end of the latter against an inwardly projecting shoulder 52 formed in the casing 26a. The arrangement and operation of the lighter element assembly 32 is the same as already described.

FIGURES 6–8 show another modified form of the invention wherein the casing 53, containing the battery 54, which may be either a replaceable or a rechargeable battery, is provided in its upper end portion with a pair of slots 55 so that a portion of the casing between the slots forms a resiliently depressible tongue 56. The resistance wire 57 is carried by an insulating grid 58 in the casing 53 above the battery 54, the grid having an air passage 59. One end of the resistance wire 57 is connected to a center contact 60 at the underside of the grid 58 while its other end is connected to a lateral contact 61 provided on the grid 58 in spaced adjacent relation to the tongue 56 of the casing 53. When the tongue 56 is pressed inwardly to engage the contact 61, circuit through the battery and resistance wire is completed, but when pressure on the tongue is released, the tongue returns to its initial position and interrupts the flow of current through the resistance wire. A removable cap or closure 62 is provided on the casing 53 to cover the lighter element when the device is not in use, it being noted that when the cap is in position, it also covers the tongue 56 so that it cannot be accidentally or unintentionally depressed.

The modified embodiment shown in FIGURE 9 is similar to that shown in FIGURES 6–8 but utilizes a different switch operator which, in this instance, is in the form of a button 63 slidably positioned in a slot 64 in the casing 65. One end of the resistance wire 57 is connected as at 66 to the battery contact 31 while its other end is connected to the contact 67 on the grid 58a. The button 63 carries a contact element 68 which engages the contact 67 when the button is slid upwardly as indicated at 69, but is disengaged therefrom when the button is slid downwardly to break the circuit. A removable closure cap 62a is provided on the casing 65 and the lower edge 70 of this cap abuts the button 63 in the downwardly slid position of the latter, so that the button cannot be slid upwardly to close the circuit unless the cap 62a is removed.

FIGURES 10 and 11 illustrate another modified embodiment of the invention wherein the casing 71 of the battery 72 accommodates above the battery a vertically slidable grid 73 carrying the resistance wire 74. The casing 71 is preferably rectangular in cross-section and the upper portion of one of its side walls is formed with an opening 75 spanned by a cross bar 76. The latter constitutes a fulcrum for a substantially tubular hinge member 77 of a closure 78, the member 77 being provided with a cam 79 which engages the upper surface of the grid 73 as shown. A pair of stop lugs 80 are provided in the casing 71 to also engage the upper surface of the grid, it being understood that when the closure 78 is swung in the direction of the arrow 81 to its closed position, the grid 73 is swung downwardly in the casing with the lugs 80 acting as fulcrum therefor. A suitable spring 82 is interposed between the battery 72 and the underside of the grid 73 to slide the latter upwardly when the closure is opened.

One end 83 of the resistance wire 74 is disposed on the grid 73 so that it constantly contacts one of the lugs 80, thus placing the wire 74 in circuit with the casing 71 of the battery 72. The center pole 84 of the battery is equipped with an extension arm 85 which passes slidably through the grid 73 and terminates at its upper end in an angulated portion 86. The other end 87 of the resistance wire is disposed on the grid 73 so that it contacts the portion 86 of the arm 85 when the grid is swung upwardly, thus completing the circuit through the battery and the resistance wire when the closure 78 is in its open position. However, when the closure is swung to its closed position, the downward swinging of the grid 73 interrupts the circuit between the wire end 83 and lug 80 and between the wire end 87 and arm portion 86 to prevent energization of the resistance wire.

Another modified form of the invention shown in FIGURES 12 and 13 utilizes a cylindrical, metallic inner casing 88 containing a battery 89 and provided with an insulating jacket 90 which, in turn, is contained in an open-ended metallic outer casing 91. The lower end of the outer casing 81 terminates short of the lower end of the inner casing 88 and jacket 89, and the upper end portion of the outer casing accommodates a grid 92 carrying the resistance wire 93. The upper end portion of the casing 91 is formed with an inturned bead or rim 94 to retain the grid in place, the underside of the grid being in abutment with the upper end of the jacket 90, as shown. One end of the resistance wire 93 is connected to the center pole 95 of the battery 89 while the other end of the resistance wire is grounded to the outer casing 91. A removable closure cap or cover 96 is positionable selectively on the upper and lower end portions of the casing 91, the cap being formed from suitable conductive material. Thus, when the cap is positioned at the lower end of the casing 91 as shown in FIGURE 13, it electrically bridges the casings 91 and 88 by contact of the cap with the bottom 88a of the casing 88. In this manner the electrical circuit through the battery and resistance wire is completed, it being noted that with the cap 96 at the lower end of the casing 91, the resistance wire 93 is exposed for use. However, when the cap 96 is positioned on the upper end of the casing 91 so as to cover the resistance wire 93 when the device is not in use, the electrical connection between the casings 88 and 91 is broken and the resistance wire is not energized.

Finally, FIGURES 14 and 15 show another modified form of the invention utilizing a heating effect of the hot and cold junction type in place of a resistance wire. In this embodiment the casing 97 accommodates a battery 98 which is longitudinally slidable in the casing, being urged upwardly therein by a suitable spring 99 interposed between the bottom of the battery and a removable plug or cap 100 at the lower end of the casing. The upper end portion of the casing accommodates a grid 101 which is held in place by an inturned shoulder 102 at the upper end of the casing and by a set of inwardly projecting detents 103 formed in the casing at the underside of the grid. A contact bracket 104 is secured in the casing by a suitable screw 105 at a point below the lower end of the battery and provides the "cold" junction for an electrical conductor 106 which extends upwardly in the casing and through the grid 101 to a "hot" junction 107 with another conductor 108 of a dissimilar material. The latter is connected to the center pole 109 of the battery 98, having enough slack to permit sliding of the battery as aforesaid.

A switch lever 110 engages an insulating disk 111 on top of the battery 98 and has one end 112 thereof in abutment with the underside of the grid 101. The other end portion of the lever 110 is in the form of a finger-piece 112 which projects outwardly through a slot 113 formed in an inwardly offset portion 114 of the casing 97 so that the finger-piece does not protrude outwardly beyond the periphery of the casing. The spring 99 normally retains the battery in its upwardly slid position wherein the "cold" junction 104 is separated from the battery and no current flows through the circuit. However, when the finger-piece 112 is pressed downwardly, the battery 98 is slid downwardly in the casing 97 until it engages the "cold" junction 104, at which time current flows through the conductors 106, 108 and produces a heating effect at the "hot" junction 107. Suitable air passages 115 are provided in the grid 101 and a removable closure cap or cover 116 is provided on the casing 97. The cap 116 is equipped with an inwardly projecting annular shoulder 117 for abutment with the upper end of the casing 97 and when the cap is in position on the casing, it covers the inwardly offset casing portion 114 so as to prevent accidental or unintentional actuation of the finger-piece 112.

FIGURE 16 schematically illustrates the wiring arrangement of the embodiments of FIGURES 1–13 wherein the switch means S representing any of the various forms of switch means used in these embodiments are connected in series with the battery B and the resistance wire R. FIGURE 17 on the other hand shows the wiring arrangement of the embodiment of FIGURES 14 and 15, wherein the switch means 104 at the "cold" junction are in circuit with the battery 98 and dissimilar conductors 106 and 108 to produce a heating effect at the "hot" junction 107.

From the standpoint of design, FIGURE 18 illustrates a relatively slender, cylindrical form of the device such as may embody the mechanical structure of the invention as disclosed, while FIGURE 19 illustrates the same in the form of an elongated casing of a rectangular cross-section. FIGURE 20 shows the device in a substantially disk-shaped form suitable for carrying in a handbag, for example, while FIGURE 21 shows a desk or table embodiment of the design.

While in the foregoing there have been described and shown several preferred embodiments of the invention, various other modifications may become apparent to those skilled in the art to which the invention relates. Accordingly, it is not desired to limit the invention to this disclosure and various modifications may be resorted to, such as may lie within the spirit and scope of the appended claims.

What is claimed as new is:
1. In a portable electric lighter, the combination of a tubular casing having an open end and formed from electrically conductive material, a grid of insulating material mounted in the open end portion of said casing, a lighter element supported by said grid, a battery provided in the casing and having one pole thereof in circuit therewith, the other pole of said battery being in circuit with one end of said lighter element, a contact member provided on on said grid in spaced relation from said casing and having the other end of said lighter element connected thereto, said open end portion of said casing having movable contact means engageable with said contact member to complete the circuit through said lighter element when said contact means are moved to the circuit closing position, and a closure cap for said lighter element slidably and removably positioned on the open end portion of said casing, said cap when positioned on the casing engaging said movable contact means so as to prevent the contact means from being moved to the circuit closing position until the cap is removed from the casing, the open end portion of said casing being formed with a pair of spaced slots having open ends at the open end of the casing, a portion of the casing between said slots constituting a resiliently depressible tongue engageable with said contact member when depressed, said tongue constituting said movable contact means of said casing, and said cap when positioned on the casing covering said tongue to prevent the same from being depressed until the cap is removed.

2. In a portable electric lighter, the combination of a tubular casing having an open end and formed from electrically conductive material, a grid of insulating material mounted in the open end portion of said casing, a lighter element supported by said grid, a battery provided in the casing and having one pole thereof in circuit therewith, the other pole of said battery being in circuit with one end of said lighter element, a contact member provided on on said grid in spaced relation from said casing and having the other end of said lighter element connected thereto, said open end portion of said casing having movable contact means engageable with said contact member to complete the circuit through said lighter element when said contact means are moved to the circuit closing position, and a closure cap for said lighter element slidably and removably positioned on the open end portion of said casing, said cap when positioned on the casing engaging said movable contact means so as to prevent the contact means from being moved to the circuit closing position until the cap is removed from the casing, the open end portion of said casing being provided with a longitudinal slot, said movable contact means comprising an electrically conductive finger piece slidable in said slot and engageable with said contact member when slid toward the open end of the casing, said cap when positioned on the casing abutting said finger piece in a position where it is slid away from the open end of the casing, whereby to prevent sliding of the finger piece to the contact member engaging position until the cap is removed.

References Cited in the file of this patent

UNITED STATES PATENTS

| 2,199,885 | Kravchuk | May 7, 1940 |
| 2,240,678 | Stanard | May 6, 1941 |
| 2,516,843 | Bakst et al. | Aug. 1, 1950 |
| 2,728,844 | Terney | Dec. 27, 1955 |

FOREIGN PATENTS

| 387,582 | Great Britain | Feb. 9, 1933 |
| 549,164 | Great Britain | Nov. 9, 1942 |
| 552,594 | Great Britain | Apr. 15, 1943 |
| 626,494 | Great Britain | July 15, 1949 |
| 814,183 | France | Mar. 15, 1937 |
| 934,833 | France | Jan. 10, 1948 |